Sept. 13, 1938. H. W. HAZELIP 2,130,009
LUBRICANT INJECTING TOOL
Filed July 24, 1936
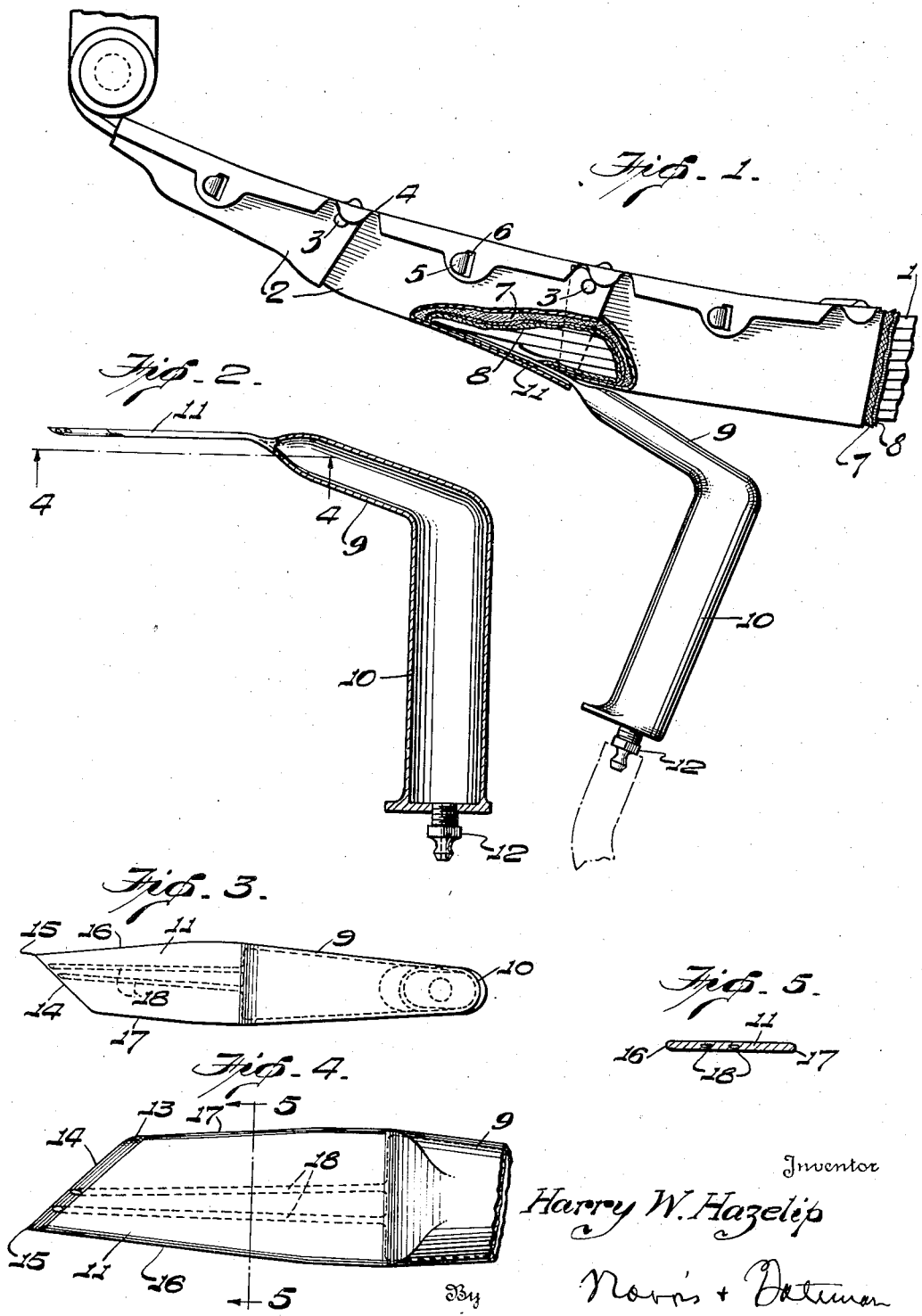
Inventor
Harry W. Hazelip
By Norris + Bateman
Attorneys.

Patented Sept. 13, 1938

2,130,009

UNITED STATES PATENT OFFICE 2,130,009

LUBRICANT INJECTING TOOL

Harry W. Hazelip, Baltimore, Md.

Application July 24, 1936, Serial No. 92,465

11 Claims. (Cl. 184—1)

The present invention relates to improvements in lubricant injecting tools, and more especially to tools for injecting grease or other lubricant into spring covers of the kinds commonly used on autombles and other vehicles.

The supporting springs for automobiles are now commonly provided with metal covers to contain a supply of grease or other lubricant for the leaves of the springs in order to maintain the contacting surfaces of the spring leaves in properly lubricated condition to afford the desired riding qualities of the automobile. Although the spring covers are initially supplied with grease or lubricant at the factory, replenishment of the supply of grease or lubricant becomes necessary from time to time.

Heretofore, the replenishment of the supply of grease or lubricant for such spring covers has been accomplished by partially removing the covers or by boring holes through the covers so that the grease or lubricant may be injected into the covers, but such practices consume a considerable amount of time and they are otherwise objectionable and unsatisfactory.

The primary object of the present invention is to provide a tool which can be readily introduced into the spring covers without the necessity of partially removing the covers or boring holes therein, the tool being capable of manipulation with facility by the ordinary attendant of an automobile service station, the tool being so insertable into the cover that it will inject the grease or lubricant most effectively therein, thus saving a considerable amount of time and labor in the servicing of covered springs.

The invention is more particularly applicable to the servicing of covered springs in which the spring cover comprises an outer casing of sheet metal or other material having overlapping joints, and an inner lining of fabric or other textile material, the tool provided by the present invention being so constructed that it may be readily inserted in one or more of the joints of the cover and will penetrate through the inner lining to the interior thereof where the grease or lubricant, when injected will be brought into intimate relation with the spring, the tool being so shaped that while it will penetrate the inner fabric or other lining, it will form and maintain a seal therewith and thereby prevent back flow of the grease or lubricant when the latter is injected.

To these and other ends, the invention consists in certain improvements as will be hereinafter more fully described the features of novelty being pointed out more particularly in the claims at the end of this specification.

In the accompanying drawing:

Figure 1 is a side elevation, partly in section, of a portion of a covered automobile spring, showing the tool, according to the present invention, inserted into the cover for the injection of grease or lubricant therein;

Fig. 2 is a detail enlarged view of the tool, shown partly in longitudinal section;

Fig. 3 shows the tool as viewed from the top in Fig. 2;

Fig. 4 represents a section taken on the line 4—4 in Fig. 2 and looking in the direction of the arrows and Fig. 5 is transverse section taken on the line 5—5 in Fig. 4.

Similar parts are designated by the same reference characters in the several figures.

Lubricant injecting tools provided by the present invention are adapted for use generally for the injection of grease or other lubricant into spring covers of various kinds, and the preferred form of the tool is shown in the accompanying drawing as applied to a spring cover of one particular form. It is to be understood however that the invention is not restricted to the precise form of the tool shown since equivalent constructions are contemplated and such will be included within the scope of the claims, and it is also to be understood that the invention is not limited in its use to spring covers of any particular kind.

In the present instance, 1 represents a portion of a conventional form of automobile or vehicle spring composed as usual of a number of superposed leaves which, as well known, slide more or less upon one another as the spring bends in response to inequalities in the roadway or surface over which the vehicle passes. The spring cover shown applied to the spring comprises in the present instance a suitable number of substantially channel-shaped sections 2 which are adapted to fit around the bottom and sides of the spring, these sections being telescoped by overlapping at their adjacent ends thus forming joints between the sections, and the sections of the cover are pivotally connected by rivets 3 which extend through the overlapped portions of the cover sections at the sides thereof and near their upper edges, thus permitting relative pivotal movements between the cover sections to compensate for the bending of the spring. The top of the cover comprises a sheet metal or other flexible or bendable plate 4 which fits over the top of the spring and the upper edges of the cover sections 2, the longitudinal edges of this plate being flanged or bent downwardly against the sides of the sections 2 and being secured to the latter by tongues 5 which may be struck up from the sections 2, extended through slots 6 in the overlapping flanges of the top plate, and then clenched against the downturned flanges of the top plate 4. The spring cover as thus described is usually made of sheet metal. The spring cover contains a lining 7 composed of a sheet of canvas or other textile fabric, and the canvas or fabric lining usually contains a sheet of felt or other absorbent material 8. The canvas or fabric sheet 7 and the felt or absorbent sheet 8 are wrapped transversely around the spring, after which the cover sections are applied to the underside of the spring and the top plate is applied to the top of the spring and secured to the cover sections in the manner described above. While one particular form of spring cover is shown and described, it will be understood that the invention is applicable to spring covers of other constructions.

The grease or lubricant injecting tool according to the present invention and as shown in the present instance, comprises a hollow body having a tubular shank portion 9, a tubular or hollow handle portion 10, a blade portion 11, and a fitting 12 for the attachment of a grease gun or hose. The blade portion 11 is relatively long and flat so that it may easily enter between the overlapped portions which form the joint between adjacent cover sections 2 and enter the cover to sufficient extent to effectively introduce the grease or lubricant into the cover. The extremity of this blade portion 11 is bevelled or inclined in a direction transversely of the length of the tool and is also bevelled on one of the flat faces of the blade portion, as at 13 to form a sharp cutting edge 14 which forms a piercing point 15 where it joins the side edge 16 of the blade portion. By this construction, when the tool is inserted into a joint of the spring cover, the point 15 of the blade portion will pierce the fabric or other lining of the cover where it extends across the joint of the cover, and as the insertion of the blade portion into the cover continues, the sharp edge 14 thereof will cut or slit the fabric or other lining of the cover and thereby provide an opening therein of sufficient width to admit the blade portion of the tool. The longitudinal edges 16 and 17 of the blade portion of the tool are also preferably convergent toward the end thereof provided with the cutting edge 14, so that the width of the blade portion increases substantially throughout its length toward the shank portion of the tool, in consequence of which, as the blade portion of the tool passes through the fabric or other lining of the cover, after the lining has been cut by the cutting edge 14, these convergent edges 16 and 17 of the blade portion will produce a pressure upon the ends of the cut in the fabric lining made by the cutting edge 14, and this pressure will increase as the blade portion is further inserted into the cover, thereby maintaining effective seals between the edges 16 and 17 of the blade portion and the fabric or other lining which will prevent back flow of grease or other lubricant from the cover along the blade portion under the pressure with which the grease or lubricant is injected into the cover. Since the cutting edge 14 is in the form of a knife edge, it will merely slit the fabric or other lining without removing any portion therefrom and consequently the flat sides of the blade portion will produce a pressure upon the edges of the slit formed in the fabric or other lining and thus prevent back flow of grease or lubricant from the cover as the grease or lubricant is injected under pressure therein. The blade portion is formed interiorly with a suitable number of ducts or channels 18 which lead from the hollow shank portion 9 to the bevelled portion 13 immediately adjacent to the cutting edge 14, and by attaching a grease gun or hose to the fitting 12, after the blade of the tool has been inserted into the spring cover and through the fabric or other lining therein, grease or lubricant is forced through the hollow handle portion 10 and shank portion 9 and through the ducts or channels 18 to the extremity of the blade portion which will have been inserted through the joint in the cover and through the fabric or other lining, and hence the grease or lubricant will be injected into the interior of the cover and of the lining therein when used and will be thus brought into intimate relation with the leaves of the spring.

The insertion of the blade portion of the tool into the spring cover in the manner described may be accomplished readily and with facility by grasping the handle portion 10 of the tool, inserting the tip of the blade portion into the joint between the sections of the spring cover and then forcing the blade longitudinally into the cover, and when the tool is removed from the spring cover, after replenishment of the grease or lubricant therein, and which is accomplished by merely withdrawing the blade portion by movement in a direction opposite to that by which it was inserted, the slit or cut formed in the lining of the spring cover will tend to close and thereby retain the lubricant in the cover.

The shank portion 9 of the tool preferably extends at an incline to one side of the plane of the blade portion 11, as shown in Fig. 2, so that it will not obstruct the placing of the blade portion in a position approximately parallel to the length of the spring, as will be seen from Fig. 1, and the handle portion 10, which is preferably used, extends preferably at approximately a right angle in relation to the plane of the blade portion 11 so that the hand of the attendant, when grasping the handle portion and manipulating the tool thereby, will not be injured by striking against the spring or spring cover.

The tool may be made in different ways. For example as shown in the present instance it may be made from a tube of suitable metal one end of which is flattened, after the insertion of wires of relatively harder metal therein, to form the relatively flat and wide blade portion 11 and the grease injecting ducts or channels 18 therein, the wires being withdrawn after the ducts or channels 18 have been formed. The tool however may be cast from suitable metal or formed in other ways.

I claim as my invention:—

1. A tool for injecting a lubricant into a jointed spring cover, comprising a flat blade portion of substantially uniform thickness longitudinally adapting it for insertion into a joint in the spring cover and having a duct extending therethrough and discharging at the end thereof for the injection of the lubricant into said cover.

2. A tool for injecting a lubricant into a spring cover having joints, comprising a flat blade portion bevelled at its extremity from one to the other of its flat sides for insertion endwise through a joint in the spring cover and into the interior thereof, said blade portion having a duct therein discharging at the end thereof for the injection of the lubricant into said cover.

3. A tool for injecting a lubricant into a jointed spring cover having a lining of textile material, comprising a flat blade portion of substantially uniform thickness longitudinally for insertion into a joint of the cover and having its extremity inclined relatively to the sides thereof and thus forming a piercing point at its end, said blade portion having a lubricant injecting duct extending toward and discharging endwise at its extremity.

4. A tool for injecting a lubricant into a jointed spring cover having an inner lining of textile material, comprising a flat blade portion having its extremity inclined relatively to the side edges thereof, and bevelled at one only of the flat sides thereof to adapt it to enter a joint of the cover and to form a piercing point for piercing said inner lining and an adjacent cutting edge for slitting said lining to admit the blade portion, and having a lubricant injecting duct extending toward its extremity and intersecting said bevelled portion wholly at one side of said cutting edge.

5. A tool for injecting a lubricant into a jointed spring cover having an inner lining of textile material, comprising a flat blade portion having a bevelled surface forming a cutting edge at its extremity adapted to enter a joint of the cover and slit the lining and side edges which converge toward said cutting edge to maintain a lubricant seal with the slit formed in the lining, the blade portion having a duct therein extending to and intersecting said bevelled surface wholly at one side of said cutting edge.

6. A tool of the class described comprising a relatively flat blade portion having at its extremity and extending from one only of its flat sides a bevelled surface forming a relatively sharp edge which is oblique to the length of the blade portion and forms a piercing point adjacent to a side edge of the blade portion, the blade portion being tapered in width toward its extremity, the blade portion having a lubricant injecting duct therein leading to its extremity and intersecting said bevelled surface wholly at one side of said sharp edge.

7. A tool for injecting a lubricant into a spring cover having joints and an inner lining of textile material, comprising a flat blade portion of substantially uniform thickness longitudinally adapting it for insertion into a joint of the cover and having at one side of its extremity a piercing point forming an acute angle with a side edge of the blade portion for perforating the inner lining, the blade portion having a lubricant injecting duct therein discharging at its extremity at one side of said piercing point.

8. A tool for injecting a lubricant into a spring cover having joints and an inner lining of textile material, comprising a flat blade portion of substantially uniform thickness longitudinally adapting it for insertion into a joint of the cover and having at its extremity a piercing point forming an acute angle with a side edge of the blade portion and an adjacent cutting edge for perforating and cutting through the inner lining, the blade being bevelled at one side of said cutting edge, the blade portion having a lubricant injecting duct therein leading to said bevelled portion wholly at one side of the cutting edge.

9. A tool for injecting a lubricant into a spring cover having joints and an inner lining of textile material, comprising a flat blade portion of substantially uniform thickness longitudinally adapting it for insertion into a joint of the cover and having at its extremity a piercing point and an adjacent cutting edge for perforating and cutting through the inner lining, the longitudinal edges of the blade portion being tapered toward the extremity of the blade portion to form seals with the ends of the cut made in the inner lining, the blade being bevelled at one side only of said cutting edge, the blade portion having a lubricant injecting duct therein leading to and discharging at the bevelled portion at one side of the cutting edge.

10. A tool of the class described comprising a flat blade portion of substantially uniform thickness throughout its length and having a relatively sharp edge at its extremity, the blade being bevelled at one side only of said edge and having a duct leading to said bevelled portion, and a hollow shank connected rigidly to the other end of the blade portion and extending at an incline to the plane of the blade portion, the interior of the shank portion communicating with said duct.

11. A tool of the class described comprising a flat blade portion having at its extremity a piercing point and a cutting edge adjacent thereto and extending obliquely to the length of the blade portion, the blade portion being of substantially uniform thickness throughout its length but tapered in width toward its extremity, the blade portion having a duct therein leading to and discharging endwise at its extremity, a hollow shank portion connected rigidly to the wider end of the blade portion and extending in a direction inclined to the plane thereof, the interior of the shank portion communicating with said duct, and a handle portion connected rigidly to the shank portion and extending in a direction transversely of the blade portion, and means for supplying a fluid to the tool for injection through said duct to the extremity of the blade portion.

HARRY W. HAZELIP.